(12) United States Patent
Jordan

(10) Patent No.: US 6,327,345 B1
(45) Date of Patent: *Dec. 4, 2001

(54) METHOD AND SYSTEM THEREFOR OF ESTABLISHING AN ACCEPTANCE THRESHOLD FOR CONTROLLING FRAUDULENT TELEPHONE CALLS

(75) Inventor: David P. Jordan, Alexandria, VA (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/307,249

(22) Filed: Sep. 16, 1994

(51) Int. Cl.[7] .................................................. H04M 1/66
(52) U.S. Cl. ................................... 379/88.02; 379/114.14
(58) Field of Search .............................. 379/67, 88, 89, 379/189, 196, 199, 249, 67.1, 88.01, 88.02, 213, 214, 114.14, 210.02, 207.13; 704/2.79, 2.82, 2.84

(56) References Cited

U.S. PATENT DOCUMENTS

| | | | |
|---|---|---|---|
| 4,756,020 | * | 7/1988 | Fodale .................................... 379/112 |
| 4,799,255 | * | 1/1989 | Billinger et al. ...................... 379/189 |
| 4,935,956 | * | 6/1990 | Hellwarth et al. ..................... 379/88 |
| 5,163,083 | * | 11/1992 | Dowden et al. ........................ 379/88 |
| 5,181,238 | * | 1/1993 | Medamana et al. .................... 379/94 |
| 5,222,120 | * | 6/1993 | McLeod et al. ........................ 379/88 |
| 5,265,191 | * | 11/1993 | McNair ................................ 395/2.84 |
| 5,274,695 | * | 12/1993 | Green .................................... 379/189 |
| 5,297,194 | * | 3/1994 | Hunt et al. .............................. 379/88 |
| 5,311,594 | * | 5/1994 | Penzias ................................... 380/23 |
| 5,315,649 | * | 5/1994 | Foster et al. ........................... 379/88 |
| 5,325,421 | * | 6/1994 | Hou et al. ............................... 379/67 |
| 5,345,595 | * | 9/1994 | Johnson et al. ........................ 379/60 |
| 5,365,574 | * | 11/1994 | Hunt et al. .............................. 379/88 |
| 5,365,580 | * | 11/1994 | Morisaki ............................... 379/189 |
| 5,414,755 | * | 5/1995 | Bahler et al. ........................... 379/67 |
| 5,465,290 | * | 11/1995 | Hampton et al. ...................... 379/67 |
| 5,502,759 | * | 3/1996 | Cheng et al. ..................... 379/88.01 |
| 5,517,558 | * | 5/1996 | Schalk .............................. 379/88.01 |
| 5,623,539 | * | 4/1997 | Bassenyemukasa et al. .... 379/88.01 |

* cited by examiner

Primary Examiner—Scott L. Weaver

(57) ABSTRACT

The present invention advanced voice application system takes advantage of information, or attributes, built into a telecommunications network to determine the risk that a call is a fraudulent call in a voice recognition and verification system. To achieve this end, information relating to the telecommunications network are stored in a database as various risk factors. Thus, depending on the type of risk factors associated with a particular call, the risk assigned to that call can be raised or lowered so that the network would not reject a valid caller even though the voice pattern of the caller does not match exactly with the prestored enrolled voice print of the caller. Such risk assessment allows the management of the network to tighten the security of the system without overburdening the caller with questions and also permits calls to be completed for valid subscribers that otherwise would have been rejected. Past calling history may be added to the database as it relates to the different risk factors so that constantly updated risk factors may be used for further assessing whether a call is to be completed.

13 Claims, 2 Drawing Sheets

METHOD AND SYSTEM THEREFOR OF ESTABLISHING AN ACCEPTANCE THRESHOLD FOR CONTROLLING FRAUDULENT TELEPHONE CALLS

This application is related to application entitled "Method For Controlling Fraudulent Telephone Calls" filed Aug. 16, 1993 having application Ser. No. 08/106,990 now U.S. Pat. No. 5,566,234.

FIELD OF THE INVENTION

The present invention relates to telephony and more particularly to prevention of fraudulent telephone calls.

BACKGROUND OF THE INVENTION

In an attempt to provide easy access to telephone services (and of course profits attached thereto), attempts have been made by the telephone companies to ease the way in which a caller can gain access to the telephone network. Conventionally, this is done by a caller inputting, by means of the telephone key pad, a series of numbers reflected on a credit or authorization card issued to him. This tends to be quite cumbersome insofar as the number string tends to be long.

A more recent advance in technology is the marriage of voice recognition and verification to telephony. Such technology is described, for example, in Hunt et al. U.S. Pat. No. 5,125,022, whereby a caller only needs to utter an identification number to make a call. However, as is with all voice recognition systems, there are many instances in which calls made by legitimate callers are rejected, while calls made by fraudulent callers are completed. This high rate of error is oftentimes due to factors inherent in the telephone network such as, for example, static over the telephone line, extraneous noises, the caller happens to have a cold on that day, etc.

Needless to say, the refusal to connect legitimate calls and connection of fraudulent calls are financially unacceptable. And attempts have been made to overcome these deficiencies.

One of the more recent attempts is to route a caller whose authenticity cannot be verified to an operator who then would ask the caller a number of personal questions. If the caller is able to provide the correct answers, the call is completed. If not, the caller is refused service. One disadvantage of this system is that a significant amount of time needs to be expanded by the caller, as he is being asked various questions by the operator. For legitimate callers, this can become a nuisance.

A need therefore arises for a system, and/or a method therefor, of increasing the probability that fraudulent calls are rejected, while at the same time lessening the burden that is placed on the caller to prove that he indeed is the authorized caller.

SUMMARY OF THE INVENTION

The present invention takes into consideration attributes that are built into the telephone network system for creating a margin of error window that enables the system to determine, with a much higher degree of accuracy, of whether a call is legitimate. In particular, when a caller places a call, the system would prompt the caller to speak an utterance, such as for example an identification number, to be recognized by the voice recognition device of the system. A prestored voice print corresponding to the utterance of the authentic caller is retrieved from a database to be matched with the voice of the caller. If a match is made, the call is completed to the call destination. On the other hand, if the prestored voice print and the utterance do not match, various risk factors associated with the call are taken into consideration for determining whether to complete the call. Some of these factors include, but not limited to, the call origination number, the place where the call is made, the time of the day, day of the week, the call destination, how many times the caller has made a call to the call destination, whether the day is a holiday, etc.

If after having taken into consideration the different risk factors and the call is still deemed to be marginal, the caller is routed either to some automated query system or an operator who would ask the caller a number of personal questions. If the answers provided by the caller do not match those provided during the enrollment of the authentic caller, the call is refused to be completed. On the other hand, if the operator, or the query system, determines that the caller is legitimate, the call is completed.

It is therefore an objective of the present invention to provide a system, and a method therefor, to enhance detection of fraudulent calls.

It is yet another objective of the present invention to provide a system, and method therefor, of preventing fraudulent calls without, at the same time, antagonizing legitimate callers.

It is yet another objective of the present invention to provide a fraudulent call detection system that eliminates to a great extent any active or knowing participation by the caller in the detection of fraudulent calls.

DETAILED DESCRIPTION OF THE INVENTION

Figure 1:
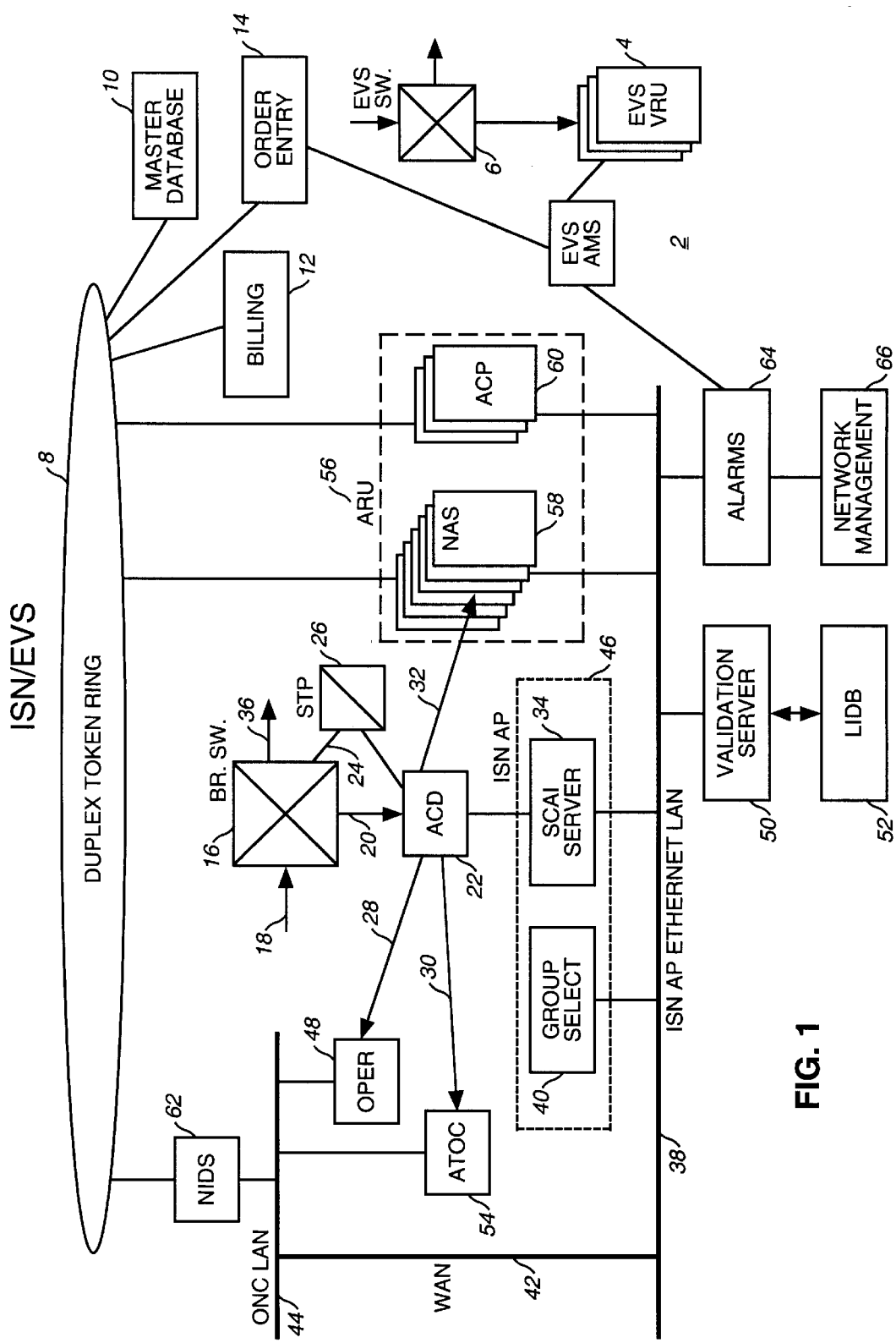
FIG. 1 is an overall schematic illustrating the different components of the operating platform to which the present invention system is integrated.

Focus to FIG. 1 which shows a sub-network client server architecture platform for performing Advanced Voice Applications (AVA). In brief, all of the processes of AVA can be seen in FIG. 1 in which calls would come in over a T1 (T-carrier system) or an analog line. The system shown in FIG. 1 would answer the call, converse with the caller, does a database look-up, and dials out the call.

In particular, the FIG. 1 system is a combination Intelligent Services Network/Enhanced Voice Services (ISN/EVS) system. This is a sub-network of a telecommunications network that processes enhanced services, for example card products such as STAR CARD and PREMIERE ADVANTAGE, etc. of the MCI Communications Corporation.

The EVS system is basically shown on the right side of FIG. 1 and comprises EVS AMS (Audio Management System) 2, EVA VRU (Voice Response Unit) 2 and EVS SW (Switch) 6. The EVS portion of the system is a platform that is used to provide 800 call menu routing. Menu routing refers to a caller being able to press various keys of a touch tone pad in order to reach someone who can satisfy his needs. For example, by pressing 1, the caller may be routed to an operator of the company, 2 the service department, 3 the ordering department, etc.

Within EVS, AMS 2 comprises a general purpose computer which maintains items required for EVS. One of the items is a collection of voice messages that provide the prompts, i.e., information to the caller, during the duration of the call. A second item that AMS 2 maintains is the collection of customer applications. An application refers to a specific package that a customer may want when it subscribes to EVS. Once such example may be an application that answers the 800 number calls to a company which may include the following announcement to a caller: "Thank you for calling company xyz, press 1 for sales, 2 for service, 3 for operator."

EVS VRU 4 is a voice response unit that plays out the messages in response to input DTMF tones. Oftentimes VRU 4 may include apparatus for speech recognition. A number of VRUs are shown in FIG. 1 to indicate that there are multiple devices providing the function. EVS SW 6 is a switch through which callers access the EVS portion of the FIG. 1 system.

Concentrate now on the ISN portion of the sub-network of FIG. 1. As shown, a duplex token ring network 8 connects the various databases, namely master database 10, billing database 12 and order entry database 14 to the ISN. Further included in the ISN network is a Bridging Switch (BR SW) 16 which provides an origination point for receiving a call from the network.

Imagine a caller dialing 0 for an operator. This call is provided as an input, designated by arrow 18, to bridging switch 16. Switch 16 recognizes the 0 being dialed by the caller and determines that the call is a 0 plus call. It then splits the call into a voice portion and a signal portion. The voice portion is provided per arrow 20 to an Automatic Call Distributor (ACD) 22 while the signal portion is provided per line 24 to a Signal Transfer Point (STP) 26. As is well known, the data carried by the signal is based on the out of band SS7 protocol.

ACD 22 is a switch that provides a queuing function. Putting it simply, ACD 22 surveys the different operators to determine if any of them is available. If none is, ACD 22 would hold the call, until one of the operators is available. As shown, the caller may be routed to one of three different paths 28, 30 and 32. Meanwhile, the data portion of the call is routed from ACD 22 to a SCAI (Switch to Computer Application Interface) server 34.

Once the call is routed to ACD 22 from switch 16, a standard protocol for data communication between ACD 22 and a control computer takes place in the ISN. In other words, messages that traverse between switch 16 and the control computer of the network are messages that tell ACD 22 whether to put a call on hold, conference it with other callers, route it to another operator or other third party, etc. Once determined, the call is output from ACD 22 back to switch 16, with the control signal being provided via STP 26, so that the call is output from switch 16, per output arrow 36, to its destination. At the same time, ACD 22 is disconnected from switch 36, with respect to the call. In essence, therefore, ISN of FIG. 1 is used to set up and route calls. ISN is done with its work once the originating caller is connected to the destination party.

SCAI server 34, which is part of an ISN AP (ISN Application Processor) 46, is connected to an ETHERNET LAN (Local Area Network) 38. Do note that the ISN AP 46 functions the same as a conventional OSAP (open system application processor). SCAI server 34, using the SCAI protocol, retrieves data messages from ACD 22 and converts them in accordance with the ETHERNET protocol for transmission to LAN 38. The messages from SCAI server 34 can be routed to Group Select 40, or to the WAN (Wide Area Network) 42 and then to ONC (Operator Network Center) LAN 44. The destination to which a message is routed depends on the address provided on the data portion of the call.

For an incoming call, ACD 22 would send the message to SCAI server 34, which then routes it with the correct protocol to Group Select 40. Group Select 40 is a part of ISN AP 46, and can be referred to as the back end of the processor. Similarly, SCAI server 34 is sometimes referred to as the front end of the processor. Thus, SCAI server 34 together with Group Select 40 form ISN AP 46. In particular, Group Select 40 looks at all of the data that accompanies the call, for example the dialed number, language digits if the call were to come from overseas, etc. And based on the data that accompanied the call, Group Select 40 would decide which of the three routes (28, 30 or 32) that ACD 22 should connect the call to. For example, if Group Select 40 determines from the language digits that the call is from Germany and it is to be destined for a live operator, then data is provided by ISN AP 46 back to ACD 22 to instruct ACD 22 to connect the call to an operator that speaks German.

In brief, what Group Select 40 does is to generate a new message, sent via ETHERNET LAN 38 to SCAI server 34, which then encapsulates it in its own protocol and forwards it to ACD 22. ACD 22 in turn looks for the operator agent at Operator Network Center 48 to find an available operator who is ready to receive the incoming call. When found, that particular call is connected to the particular output port so that the voice portion of the call is connected to that particular operator. At the same time, the data portion of the call is provided by SCAI server 34, via ETHERNET LAN 38, WAN 42 and ONC LAN (Operator Network Center Local Area Network) 44 to a computer, which may be a PC, in front of the operator. As its name implies, ONC LAN 44 refers to a network that routes the data relating to the call to an Operator Network Center 48 to which different groups of operators, segregated for example according to different languages, reside.

Once the appropriate operator is located, ACD 22 sends a message with the address of the computer of that operator to SCAI server 34 so that the message is routed to the screen in front of the operator. This message may show all of the data that came with the call plus it may display a prompt or a script for the operator so that the operator can tell at a glance what kind of call it is and how he could help the caller. For example, the operator may say "Hello Mr. Smith. I see you are trying to make a STAR CARD call and that you are having trouble. How can I help you?" At this time, the caller may tell the operator that he is having a problem reaching a destination. The operator then would ask the caller for her number, and having received the number from the caller, would type it into his computer to begin the process of completing the call out of the sub-network.

Some of the information being displayed to the operator during this process, as mentioned before, include the telephone number that the caller gave to the operator. One of the first things that the operator will do at that time is to validate that number to determine whether it is a viable number for which the call may be completed. The first step the computer in front of the operator does for the validation process is to perform a database look-up within the operator computer itself. For the instant embodiment, the computer in front of the operator happens to be a personal computer which may be a conventional Intel 486 computer that has a hard drive. Residing inside the hard drive is a database, referred to as BNS (Billed Number Screening) which is previously known as IBND (Interim Billed Number Database). This is a local database that contains the destination numbers that are known to be bad. In other words, were the caller to give the operator as a destination any number from this database, that call will not be completed no matter what the caller says. Putting it differently, the database is a "bad number" database.

If the billed number given by the caller is not found in the BNS, the operator, or more accurately the computer, would decide that the number given by the caller is potentially okay and thus will continue the validation process. The being called number is then sent, via ONC LAN 44, WAN 42 and ETHERNET LAN 38, to a validation server system 50. In brief, validation server 50 is a computer that has connections to various other databases and in particular to a database outside of the sub-network called LIDB (Line Information Database) 52. LIDB 52 is a BELCORE designed or RBOC maintained database that provides information about certain telephone numbers, for example pay phones. Thus, if a caller tries to make a collect call to a pay phone, LIDB 52 will provide a negative answer to the operator, who would inform the caller that the call cannot be completed to a pay phone.

If there is nothing in LIDB 52 that precludes the completion of the call to a called number, a positive response is provided by LIDB 52 to validation server 50 and from there back to the operator at center 48 via ETHERNET LAN 38, WAN 42 and ONC LAN 44. The operator, via the computer in front of him, would then complete the call by creating yet another message, which is routed to SCAI server 34 to inform ACD 22 to disconnect voice path 28 to the operator and create a message to STP 26 to instruct switch 16 to output the call at 36. At the same time, the message from STP 26 also instructs switch 16 to disconnect the voice portion of the call to ACD 22 and connect it to the outgoing line at 36. Thus, for the FIG. 1 ISN system, the network has total control of the call after the call has reached ACD 22. For some of the operations, for example for credit card product services, instead of being handled by a live operator, those services would be handled by automated platforms. Two of those platforms are shown in the FIG. 1 ISN sub-network.

One of the automated platforms is ATOC (Automated TUSA Operator Console) 54. TUSA stands for Telecom USA. The second automated platform in the FIG. 1 ISN is ARU (Audio Response Unit) 56, which comprises NAS (NIDS Audio Server) 58 and ACP (Automated Call Processor) 60. NIDS stands for Network Information Distributed Server. Functionally, ATOC 54 and ARU 56 are similar in that each plays out computer generated messages to the caller and listens to the caller's touch tone responses. Each would complete a call out to the network by sending the appropriate messages to ACD 22. Do note that, for the FIG. 1 embodiment, ARU 56 comprises a number of PCs at NAS 58 and a number of IBM RS600 RISC (Reduced Instruction Set Computing) computers at ACP 60.

A lot of massaging occur between ACP 60 and NAS 58 via ETHERNET LAN 38. For example, ACP 60 would inform NAS 58 to play a message, collect a tone, and send a message to validation server 50, etc. ACP 60, in the meantime, would examine the billing records of the caller per billing database 12 and other information relating to the caller. The database server for the operators at center 48 and ATOC 54 is provided by NIDS (Network Information Distributed Server) 62, connected to ONC LAN 44 and also to token ring LAN 8. It is via token ring LAN 8 that billing information about each call and some messages from a master database 10 are downloaded to NAS units 58 and NIDS 62. Although it does not affect the flow of the call, this type of data provided by the databases is important to the instant invention, as will be discussed later.

To round out the discussion of the FIG. 1 system, an Alarms system 64 is provided and connected to ETHERNET LAN 38. As its name implies, Alarms 64 provides an alarm to the Network Management, for instance the MCI network management, responsible for managing the network of FIG. 1, when a failure is detected in any of the subsystems. For example, if one of the NASs 58 in ARU 56 loses power, an alarm or an error message is generated and routed via ETHERNET LAN 38 to Alarms 64, which in turn forwards the error signal to the network management that oversees the operation of the system.

As was mentioned previously, one of the objectives of the instant invention is to prevent fraudulent calls. Thus, the present invention system provides additional processing to ferret out fraudulent calls. Up to this point, either internal positive validation or* an internal bad number check and a check of external databases such as LIDB 52 are performed. And if there is no indication of anything wrong, the system would proceed to complete the call. However, it has been found that even with those checks, a number of fraudulent calls would remain. undetected. Real time treatment of calls that pass muster with either the internal validation or the bad number check and the external database check is therefore needed.

Figure 2:
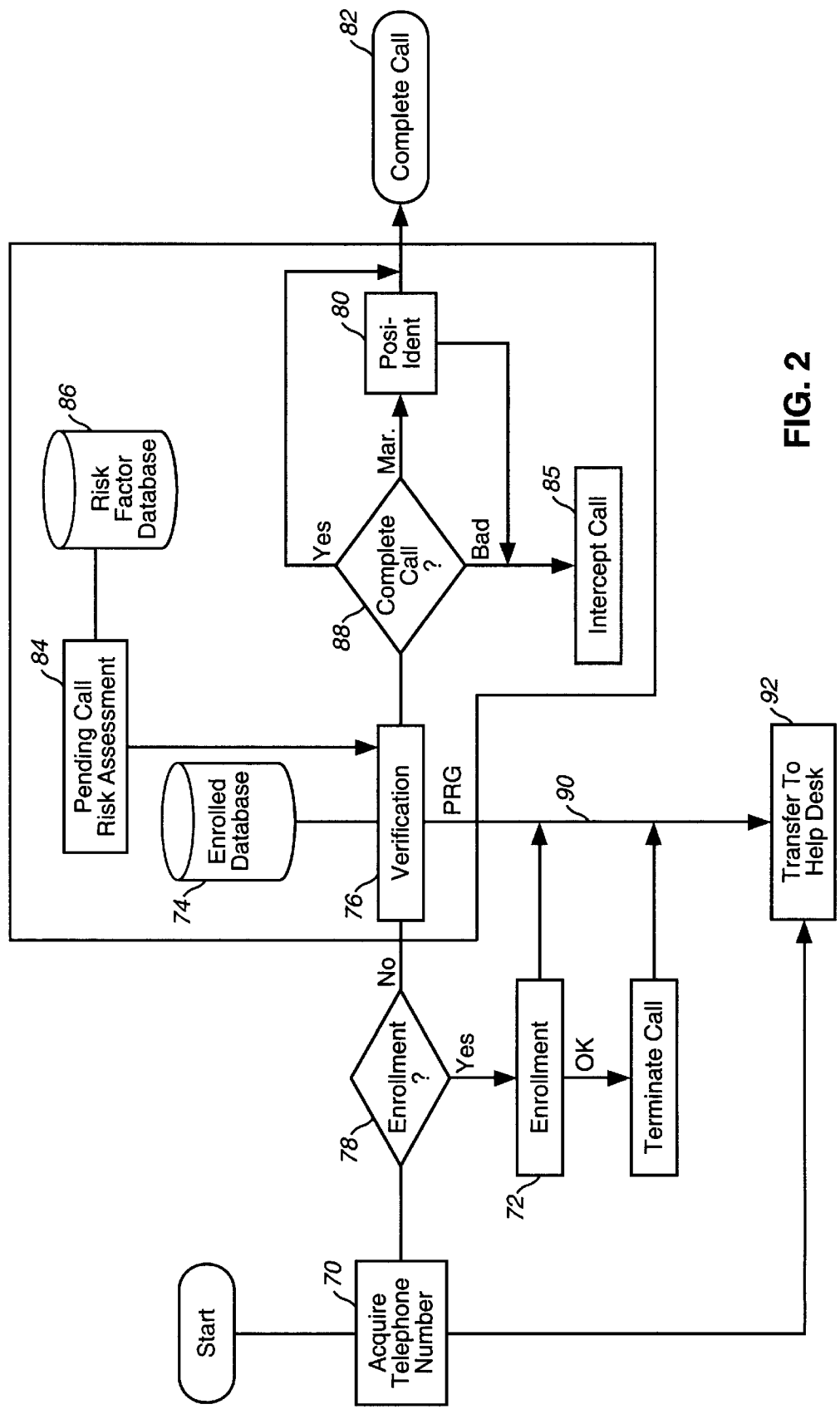
FIG. 2 is a combination flow chart/block diagram illustrating the present invention system incorporated into the FIG. 1 operating platform of a telephone communications network system.

With reference to FIG. 2, the present invention system for providing additional validation before calls are completed is shown. This system is a voice recognition and verification system that may reside at any, or all, of the following locations of the ISN system: Operator Station 48, ATOC 54, and ARU 56.

Before a caller can use the system, he needs to enroll in it. This is indicated by block 70 in which an originating number from which a caller makes his call is acquired. This is necessary in order to determine whether the caller is enrolling from his home phone or his office phone. In other words, any enrollment from certain originating telephone numbers such as pay phones are not allowed. To determine whether an originating phone is a pay phone of course is done by having validation server 50 check the originating phone number against LIDB 52 or other verification processes. The system of FIG. 2 can use the hardware as disclosed in Hunt et al. U.S. Pat. No. 5,125,022, the disclosure of which is incorporated by reference herein, for recognizing and verifying utterances of callers.

As far as enrollment is concerned, per block 72, upon connection to the system, a caller is prompted to speak an identification number, for example the caller's social security number or his phone card number, a number of times. The advanced voice application (AVA) of the instant invention would average the utterances from the speaker to smooth out the various variabilities caused by the voice and the noise on the telephone line so as to effect a single voice print that is representative of the particular caller. The caller's voice print could then be condensed, sampled, and stored in a database, such as an enrolled database 74. The voice recognition and verification processes, for the AVA system of FIG. 2, is performed in verification block 76. However, do note that the voice recognition process, insofar as it is used to acquire the destination telephone number, could be performed in block 70. In any event, when a caller is connected to the system, a determination is made in block 78 on whether or not the caller is an enrollee of the system. If he is not, the enrollment process of block 72 is offered to the caller so that he may enroll in the system. The AVA system of FIG. 2 is only used by callers who are enrolled in the system. Obviously, calls placed by a person not enrolled in the AVA system would not be completed via the AVA system. And inasmuch as voice recognition and voice verification processes are not perfect, prior to the instant invention, there is a likelihood that a valid subscriber will be rejected while a fraudulent user will be accepted by the AVA system.

The speaker verification system of the FIG. 2 embodiment of the instant invention operates as follows. A caller making a call would dial an 800 number. The AVA would answer and ask for the speaker's password, i.e., the identification number to which the speaker had previously enrolled with. Given that the voice recognition is speaker independent, the AVA is able to understand the string of digits the speaker utters as his identification number. Upon recognition of that identification number, the AVA looks up the record associated with that number and retrieves the pre-recorded voice print of the caller that was created when the caller enrolled in the system. The caller's voice pattern is then compared with the recorded voice print. If the comparison is positive, the caller is allowed to complete the call. However, if the voice print does not match the voice pattern just uttered by the caller, the AVA considers a possibility of fraud now exists.

Given the fact that, as was mentioned previously, voice technology is not perfect, the system does not want to refuse service to the caller at this point since the caller may actually be a valid caller who may for example be having a cold. To further process the call, the assignee of the instant invention has had in operation a speaker verification system known as POSI-IDENT, designated 80 in FIG. 2.

POSI-IDENT 80 comprises a database, not shown, of personal information collected from the caller during his enrollment. Such personal information may include, for example, the birth date of the caller, the number of digits in the mother's maiden name of the caller, the day the caller graduated from high school, etc. In other words, anything that was personally known to the caller which could be quantified by the caller pushing the number pad of the telephone could be considered. Thus, if the match between the recorded voice print and the utterance of the caller was not sufficiently acceptable, the call is routed to an automated response unit, such as for example ARU 56, so that questions may be asked of the caller who then would have to provide the answers by pushing the appropriate button of the telephone number pad or speaking the number. If the caller is able to answer correctly a given number of queries or personal questions, the call is allowed to be completed per block 82. On the other hand, if the answers provided by the caller are wrong, the call is routed to a call intercept subsystem 85.

Briefly, in call intercept subsystem 85, the caller is routed to a live operator where a live authentication of the caller is performed. This is because there are times when a valid caller may have forgotten certain personal information or may have pushed the wrong button, and the network management certainly does not want to antagonize a valid caller by refusing to complete his call. The detailed discussion of the call intercept subsystem and process is disclosed in co-application entitled "Method for Controlling Fraudulent Telephone Calls", filed on Aug. 16, 1993 having application Ser. No. 106,990, and assigned to the same assignee as the instant invention. The disclosure of the '990 application is incorporated herein by reference.

Given that voice technology, at least with respect to voice recognition and voice verification, is not perfect, the network management of the system has to accept a certain percentage of false acceptance and a certain percentage of false rejection. For a very secure product, the percentage of rejection and acceptance may be set to a very low percentage. However, this would not be acceptable, since it is not desirable to reject a caller out of hand, just because the caller may have a cold or may be calling from a high noise environment such as for example a steel mill. In other words, it is fine and good for a valid caller to call from an originating phone in an office, but not so good when the valid caller is calling from an air terminal or a bus station where the noise level is high.

To reduce the possibility that valid callers are not accepted while fraudulent callers may be, the present invention introduces additional parameters via a call risk assessment process, designated as 84 in FIG. 2, into evaluating the caller. What the risk assessment process does is to inject parameters, more precisely risk factors, associated with the call to evaluate whether the caller is the authorized caller he claims to be. Some of these risk factors include the called number, the caller number, the time of day the call is made, whether or not the called number is a high risk number, the day of the week, whether the day is a holiday, the number of times calls have been billed to a particular billed number over a predetermined period of time, and other additional risk factors. All of these parameters are stored in a risk factor database 86. Some of the high risk locations include, for example the Penn Central Station or the Kennedy Center. High risk numbers may include destinations such as the Dominican Republic, Iraq, and other current politically unstable countries. Past calling history may also be added for each caller to update the risk factors associated with him. Putting it differently, by incorporating risk factors, the margin of error of the sub-network accepting a fraudulent call can be reduced. An example of a low risk call scenario is given hereinbelow.

Consider an utterance provided by a caller making a call at 2:00 pm during the work week from an office phone in Baltimore, Maryland to an office phone in Washington D.C. does not perfectly match the caller's prestored voice print. This would be considered a very low risk call. Thus, based on the information the network provides, a look-up is performed on the caller and the called number in the database to see if those are high risk numbers. An assessment would then be made on whether the caller has ever made a telephone call from Baltimore to Washington before. If everything proves satisfactory, then so long as the system receives the proper identification or authorization number, the call is allowed to be completed. For this type of low risk call, the network management does not pay much attention to whether the caller sounds precisely the way he sounded when he enrolled. In other words, the system is using the attributes that are built within the telecommunications network for determining the risk associated with the call, albeit voice recognition and voice verification are still being used. Do keep in mind that the risk assessment process is interjected only if there is not a perfect match during the voice verification process.

Another scenario in which there exists a high probability of fraud is given hereinbelow. Now consider a call is made at 3:00 a.m. from the Penn Central Station. Given that the originating number is from Penn Central Station would suggest to the system right away that it is a high risk origination. In addition, the time of day also suggests that the call is a suspect call. Assume the call destination is Pakistan.

So there are now three suspicious elements each representing a particular risk. Accordingly, the AVA of the instant invention would make the window of acceptance for this call to be very small. Putting it differently, if this call is to be accepted, whoever is making the call better sound exactly the way he did when he enrolled. If not, the caller is routed to call intercept 85 so that a live operator can ask him some personal questions. And if the caller fails to provide the correct answers to the questions, the network management of the system would know that the identification number of the caller is using has been compromised and to designate that identification number as high risk so as to prevent further use thereof by the un-authorized caller. The valid subscriber of the comprised identification number may be notified of the theft of his identification number or restrictions may be applied—for example make card calls based on the identification number domestic only until the customer can be contacted or set the voice parameter to high false rejection for the next 48 hours, or other deterrents selected by the telecommunications company.

Return to FIG. 2. After having introduced the risk factors from risk assessment module 84 to verification process 76, the result of the verification is forwarded to complete call decision block 88. As shown, if a call is to be completed, it is routed to complete call 82. If it is a bad call, the caller is routed to call intercept block 85. Any marginal call is forwarded to the POSI-IDENT block 80 for further verification. If there are problems with the verification process at 76, the call is routed per line 90 to a help desk 92 whereat an operator can assist in the verification process. Likewise, help desk 92 may also assist in the enrollment of a new caller, sent per enrollment block 72.

Albeit the instant invention has been described with reference to applying risk factors to the voice verification process in order to vary the window of acceptance for a particular call, it should be appreciated that this invention may also be used for other applications. Among some of these applications include an employee verification process whereby time cards are eliminated. For this application, an employee only needs to dial in, speak her name, and the network management, i.e., in this instance representing the employer of the employee, would instantly know where the employee is calling from, what time she called, and in fact whether or not it is the employee, again taking into consideration the number of risk factors dealing with the origination station and the various attributes of the network.

Another application that could utilize the risk assessment process of the instant invention is a home incarceration program for convicts who are to be incarcerated with minimum security. In this instance, the person may be allowed to stay out of jail, although he has to be either at work or at home. The whereabouts of the offender is kept up to date by him having to call in at specific periods of time, for example every hour. This is achieved by of course keeping a record of the offender's voice print, the origination stations that he is to call from, his home number and his work number, or the telephone numbers of any other location he is to be.

Inasmuch as the present invention is subject to many variations, modifications and changes in detail, it is intended that all matters described throughout this specification and shown in the accompanying drawings be interpreted as illustrative only and not in a limiting sense. Accordingly, it is intended that the invention be limited only by the spirit and scope of the appended claims.

What is claimed is:

1. A method of controlling fraudulent telephone calls in a telecommunications network, comprising:

recognizing an utterance spoken by a voice of a caller who is placing a telephone call via the telecommunications network;

matching the voice of the caller against a pre-stored voice signature of an authentic caller; and if the voice of the caller does not match the pre-stored voice signature, evaluating at least one risk factor associated with the telephone call to determine if the telephone call is not fraudulent, said evaluating being performed automatically without receiving additional information from the caller.

2. The method of claim 1, wherein said matching is performed using a matching threshold, the matching threshold not being a function of any risk factor associated with the telephone call.

3. The method of claim 1, wherein said matching is performed using a matching threshold, the matching threshold being predetermined with respect to all callers.

4. The method of claim 1, wherein said matching is performed using a single matching threshold.

5. The method of claim 1, wherein the at least one risk factor is further associated with a plurality of callers.

6. The method of claim 1, wherein the at least one risk factor is further associated with at least one prior telephone call placed by the authentic caller.

7. The method of claim 1, wherein the at least one risk factor comprises a destination to which the telephone call is placed.

8. The method of claim 1, wherein the at least one risk factor comprises a location from which the telephone call is placed.

9. The method of claim 1, further comprising:

deciding whether the telephone call will be competed based on said evaluating.

10. The method of claim 1, further comprising:

if said evaluating does not determine that the telephone call is not fraudulent, receiving additional information from the caller to determine if the telephone call is not fraudulent based on pre-stored information associated with the authentic caller.

11. The method of claim 10, wherein said receiving is performed via at least one of: (i) a voice response received from the caller, (ii) a DTMF tone received from the caller, and (ii) an operator station associated with the telecommunications network.

12. A method of controlling fraudulent telephone calls in a telecommunications network, comprising:

identifying a telephone call being placed by a caller via the telecommunication network;

prompting the caller to speak an utterance;

recognizing the utterance spoken by a voice of the caller;

matching the voice of the caller against a pre-stored voice signature of an authentic caller using a matching threshold that is not a function of any risk factor associated with the telephone call;

evaluating at least one risk factor associated with the telephone call to determine if the telephone call is not fraudulent, said evaluating being performed (i) only if the voice of the caller does not match the pre-stored voice signature and (ii) automatically without receiving additional information from the caller; and completing the telephone call if the voice of the caller matches the pre-stored voice signature or if said evaluating determines that the telephone call is not fraudulent.

13. A system to control fraudulent telephone calls in a telecommunications network, comprising:

means for recognizing an utterance spoken by a voice of a caller who is placing a telephone call via the telecommunications network;

means for matching the voice of the caller against a pre-stored voice signature of an authentic caller; and means for evaluating at least one risk factor associated with the telephone call to determine if the telephone call is not fraudulent, the evaluating being performed automatically without receiving additional information from the caller if the voice of the caller does not match the pre-stored voice signature.

\* \* \* \* \*